US011392881B2

(12) United States Patent
Driegert et al.

(10) Patent No.: US 11,392,881 B2
(45) Date of Patent: Jul. 19, 2022

(54) FREIGHT VEHICLE MATCHING AND OPERATION

(71) Applicant: Uber Technologies, Inc., San Francisco, CA (US)

(72) Inventors: William Driegert, San Francisco, CA (US); Eric Berdinis, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 252 days.

(21) Appl. No.: 15/954,123

(22) Filed: Apr. 16, 2018

(65) Prior Publication Data

US 2019/0318298 A1 Oct. 17, 2019

(51) Int. Cl.
*G06Q 10/08* (2012.01)

(52) U.S. Cl.
CPC .................. *G06Q 10/083* (2013.01)

(58) Field of Classification Search
CPC ........ G06Q 10/00; G06Q 10/02; G06Q 10/06; G06Q 10/08; G06Q 10/083; G06Q 10/10; G06Q 10/0832; G06Q 10/0834
USPC .................. 705/26.8, 37, 335, 412
See application file for complete search history.

(56) References Cited

U.S. PATENT DOCUMENTS

| 3,953,720 | A |   | 4/1976 | Kelch |   |
|---|---|---|---|---|---|
| 5,880,958 | A | * | 3/1999 | Helms | ............... G08G 1/202 340/991 |
| 6,411,897 | B1 | * | 6/2002 | Gaspard, II | ......... G01C 21/343 340/991 |
| 6,456,207 | B1 |   | 9/2002 | Yen |   |
| 6,516,056 | B1 |   | 2/2003 | Justice et al. |   |
| 6,591,253 | B1 |   | 7/2003 | Dinkin |   |

(Continued)

FOREIGN PATENT DOCUMENTS

| CN | 101951545 | 1/2011 |
|---|---|---|
| CN | 103692969 | 4/2014 |

(Continued)

OTHER PUBLICATIONS

"How to Become an Uber Freight Driver," by Harry Campbell, Mar. 20, 2021 (Year: 2021).*

(Continued)

*Primary Examiner* — George Chen
*Assistant Examiner* — Brian Adams Heflin
(74) *Attorney, Agent, or Firm* — Dority & Manning, P.A.

(57) ABSTRACT

A network computer system operates to monitor a location of multiple freight vehicle. For each freight vehicle of a candidate set, a determination is made as to the amount of additive travel that the freight vehicle would likely incur in traveling to a loading location of a new freight load, based at least in part on the monitored location information communicated from the operator device associated with that freight operator. The network computer system implements a matching process to match the freight load with one of the freight vehicles of the candidate set. The network computer system also determines a shipment value for transporting the freight load, based on the additive amount of travel which the freight vehicle is to perform. In some examples, the network computer system directs the matched freight operator to the loading location, using a device of the matched freight operator.

19 Claims, 6 Drawing Sheets

(56) References Cited

U.S. PATENT DOCUMENTS

| | | | |
|---|---|---|---|
| 6,879,962 B1 | 4/2005 | Smith | |
| 7,315,780 B2 | 1/2008 | Sugahara et al. | |
| 7,353,181 B2* | 4/2008 | Nel | G06Q 10/08 |
| | | | 705/7.22 |
| 7,385,529 B2 | 6/2008 | Hersh | |
| 7,552,063 B1 | 6/2009 | McEachern | |
| 7,561,069 B2 | 7/2009 | Horstmeyer | |
| 8,131,307 B2 | 3/2012 | Lubeck et al. | |
| 8,271,316 B2 | 9/2012 | Blackshaw et al. | |
| 9,135,803 B1 | 9/2015 | Fields | |
| 9,256,852 B1 | 2/2016 | Myllymaki | |
| 9,478,150 B1 | 10/2016 | Fields | |
| 9,552,564 B1 | 1/2017 | Martenis | |
| 9,908,530 B1 | 3/2018 | Fields | |
| 9,921,070 B1 | 3/2018 | Nimchuck | |
| 9,955,326 B2 | 4/2018 | Avrahami | |
| 2002/0034292 A1 | 3/2002 | Tuoriniemi et al. | |
| 2002/0065738 A1* | 5/2002 | Riggs | G06Q 10/0833 |
| | | | 705/334 |
| 2002/0095308 A1 | 7/2002 | Pragelas | |
| 2002/0138338 A1 | 9/2002 | Trauth et al. | |
| 2002/0188517 A1 | 12/2002 | Banerjee | |
| 2002/0194129 A1 | 12/2002 | Furuya et al. | |
| 2003/0036935 A1 | 2/2003 | Nel | |
| 2003/0087648 A1 | 5/2003 | Mezhvinsky et al. | |
| 2003/0233190 A1 | 12/2003 | Jones | |
| 2004/0106399 A1 | 6/2004 | Ki | |
| 2004/0112959 A1 | 6/2004 | Jun | |
| 2004/0158483 A1 | 8/2004 | LeCouturier | |
| 2004/0219933 A1 | 11/2004 | Faith | |
| 2004/0249699 A1 | 12/2004 | Laurent | |
| 2004/0249818 A1 | 12/2004 | Isaac | |
| 2004/0260470 A1 | 12/2004 | Rast | |
| 2005/0096837 A1 | 5/2005 | Yoshizumi | |
| 2005/0149382 A1 | 7/2005 | Fenner et al. | |
| 2005/0227704 A1 | 10/2005 | Ferra et al. | |
| 2005/0278063 A1 | 12/2005 | Hersh et al. | |
| 2006/0059023 A1 | 3/2006 | Mashinsky | |
| 2006/0136254 A1 | 6/2006 | Greenstein | |
| 2006/0155460 A1 | 7/2006 | Raney | |
| 2006/0195348 A1 | 8/2006 | Peterkofsky | |
| 2006/0200306 A1 | 9/2006 | Adamcyzk | |
| 2006/0200396 A1 | 9/2006 | Satterfield | |
| 2006/0206387 A1 | 9/2006 | Peterkofsky | |
| 2006/0217885 A1 | 9/2006 | Crady et al. | |
| 2007/0103342 A1 | 5/2007 | Milleville | |
| 2007/0221791 A1 | 9/2007 | Voelk | |
| 2008/0086322 A1 | 4/2008 | Wallace | |
| 2008/0114629 A1 | 5/2008 | Pavlov | |
| 2008/0125967 A1 | 5/2008 | Sprigg | |
| 2008/0140597 A1 | 6/2008 | Satir | |
| 2008/0158016 A1 | 7/2008 | Wang | |
| 2008/0189207 A1 | 8/2008 | Wurster | |
| 2008/0195428 A1 | 8/2008 | O'Sullivan | |
| 2008/0270019 A1 | 10/2008 | Anderson | |
| 2008/0270204 A1 | 10/2008 | Poykko | |
| 2008/0312991 A1 | 12/2008 | Bharadwaj | |
| 2009/0030770 A1* | 1/2009 | Hersh | G06Q 10/087 |
| | | | 705/7.13 |
| 2009/0037095 A1* | 2/2009 | Jani | G06Q 10/0834 |
| | | | 701/533 |
| 2009/0049119 A1 | 2/2009 | Marcinkiewicz et al. | |
| 2009/0083111 A1 | 3/2009 | Carr | |
| 2009/0099971 A1 | 4/2009 | Salemme et al. | |
| 2009/0125228 A1 | 5/2009 | Dicke | |
| 2009/0177502 A1 | 7/2009 | Doinoff et al. | |
| 2009/0216600 A1 | 8/2009 | Hill | |
| 2009/0222284 A1 | 9/2009 | McEachern | |
| 2009/0254270 A1 | 10/2009 | Yu | |
| 2009/0313077 A1 | 12/2009 | Wheeler | |
| 2010/0017275 A1 | 1/2010 | Carlson | |
| 2010/0076988 A1 | 3/2010 | Kenedy et al. | |
| 2010/0243724 A1 | 9/2010 | Golla | |
| 2011/0010300 A1 | 1/2011 | Audet | |
| 2011/0099040 A1 | 4/2011 | Felt et al. | |
| 2011/0060600 A1 | 5/2011 | Fox et al. | |
| 2011/0137696 A1 | 6/2011 | Meyer et al. | |
| 2011/0153495 A1 | 6/2011 | Dixon | |
| 2012/0036082 A1 | 2/2012 | Cha | |
| 2012/0130627 A1 | 5/2012 | Islam et al. | |
| 2012/0179764 A1 | 7/2012 | Erdal | |
| 2012/0253548 A1 | 10/2012 | Davidson | |
| 2013/0030873 A1 | 1/2013 | Davidson | |
| 2013/0041720 A1 | 2/2013 | Spires | |
| 2013/0245991 A1 | 9/2013 | Kriss | |
| 2013/0249699 A1 | 9/2013 | Kriss | |
| 2013/0335193 A1 | 12/2013 | Hanson | |
| 2014/0122147 A1 | 5/2014 | Christie | |
| 2014/0200804 A1 | 7/2014 | Wippler | |
| 2014/0229399 A1 | 8/2014 | Ranganathan | |
| 2014/0249742 A1 | 9/2014 | Krivacic | |
| 2014/0324633 A1* | 10/2014 | Pollak | G06Q 10/083 |
| | | | 705/26.63 |
| 2014/0330596 A1 | 11/2014 | Depura | |
| 2015/0006428 A1* | 1/2015 | Miller | G06Q 10/0835 |
| | | | 705/336 |
| 2015/0081162 A1 | 3/2015 | Mitchell | |
| 2015/0085581 A1 | 3/2015 | Ikawa | |
| 2015/0161564 A1* | 6/2015 | Sweeney | G06Q 10/063114 |
| | | | 705/338 |
| 2015/0161696 A1 | 6/2015 | Jones | |
| 2015/0356703 A1* | 12/2015 | Ellis | G06Q 10/063118 |
| | | | 705/7.17 |
| 2015/0379468 A1 | 12/2015 | Harvey | |
| 2016/0012391 A1 | 1/2016 | Burnett | |
| 2016/0042303 A1 | 2/2016 | Medina | |
| 2016/0047646 A1 | 2/2016 | Ochsendorf | |
| 2016/0071056 A1 | 3/2016 | Ellison | |
| 2016/0104111 A1* | 4/2016 | Jones | G06Q 10/08355 |
| | | | 705/26.4 |
| 2016/0202069 A1 | 7/2016 | Wippler | |
| 2016/0273922 A1 | 9/2016 | Stefan | |
| 2016/0300186 A1* | 10/2016 | Scharaswak | G06Q 10/0835 |
| 2016/0334236 A1 | 11/2016 | Mason | |
| 2017/0046658 A1 | 2/2017 | Jones | |
| 2017/0109696 A1 | 4/2017 | Serjeantson | |
| 2017/0124506 A1 | 5/2017 | Khan | |
| 2017/0144671 A1 | 5/2017 | Memani | |
| 2017/0249847 A1 | 8/2017 | Marueli | |
| 2018/0025417 A1 | 1/2018 | Brathwaite | |
| 2018/0068269 A1* | 3/2018 | Pillai | G06Q 10/08345 |
| 2018/0096300 A1* | 4/2018 | Boye | G06Q 30/0283 |
| 2018/0211217 A1 | 7/2018 | Berdinis | |
| 2018/0211218 A1 | 7/2018 | Berdinis | |
| 2018/0211541 A1 | 7/2018 | Rakah | |
| 2019/0095859 A1 | 3/2019 | Pike | |
| 2019/0118825 A1 | 4/2019 | Madrigal | |
| 2019/0122551 A1 | 4/2019 | Madrigal | |
| 2019/0130351 A1 | 5/2019 | Arena | |
| 2019/0213529 A1 | 7/2019 | Donnelly | |
| 2019/0232967 A1 | 8/2019 | Madrigal | |
| 2019/0318298 A1 | 10/2019 | Driegert | |
| 2020/0005370 A1 | 1/2020 | Jung | |
| 2020/0027348 A1 | 1/2020 | Madrigal | |
| 2020/0080853 A1 | 3/2020 | Tam | |
| 2020/0242932 A1 | 7/2020 | Madrigal | |
| 2021/0042705 A1 | 2/2021 | Suen | |

FOREIGN PATENT DOCUMENTS

| | | | |
|---|---|---|---|
| CN | 103761635 | 4/2014 | |
| CN | 103870893 | 6/2014 | |
| CN | 105069594 | 11/2015 | |
| EP | 2827289 | 1/2015 | |
| JP | 2002-123887 | 4/2002 | |
| JP | 2006-323784 | 11/2006 | |
| JP | 2017-165509 | 9/2017 | |
| KR | 1020170026805 | 3/2017 | |
| NL | 2017377 | 3/2018 | |
| WO | WO 1995/027964 | 10/1995 | |
| WO | WO-9527964 A1 * | 10/1995 | G08G 1/202 |
| WO | WO 2016/133594 | 8/2016 | |
| WO | WO 2017/025955 | 2/2017 | |

(56) References Cited

FOREIGN PATENT DOCUMENTS

| WO | WO 2017/0107854 | 6/2017 |
| WO | WO 2018/0106730 | 6/2018 |
| WO | WO 2018/0107046 | 6/2018 |
| WO | WO 2018/0136179 | 7/2018 |

OTHER PUBLICATIONS

"The Convey Business Model—How Does Convoy Work & Make Money," by Viktor, Aug. 21, 2020 (Year: 2020).*

"The Rise of Digital Freight Matching and How it Works," by Rafael Granato, Jul. 25, 2019 (Year: 2019).*

"Macy's maneuver to fill empty miles," by John Kerr, Logistics Management, vol. 49, Issue 3, Mar. 1, 2010 (Year: 2010).*

Examination Report for AU 2010325793, dated Jun. 21, 2013.

Search Report dated Oct. 1, 2013, for EP 10835261.8.

Alfred Round et al. "Future Ride: Adopting New Technologies to Paratransit in the United States", Working Paper, UCTC No. 306, University of California Transportation Center, 51 pges.

Shigemitsu et al. "AVM System", Fujistu Ten Technical Journal No. 33, 27:34, (2009).

EESR in EP 10835261.8 dated Oct. 10, 2016.

Examination Report No. 2 for AU 2015202596 dated May 22, 2017.

ISR and Written Opinion dated Jan. 25, 2019 in PCT/US2018/057538.

ISR and Written Opinion dated Apr. 24, 2019 in PCT/US2019/012516.

Written Opinion dated Oct. 11, 2019 in PCT/US2019/012516.

ISR and Written Opinion in PCT/US2019/036622 dated Sep. 23, 2019.

ISR and Written Opinion issued in PCT/US2017/066765 dated Apr. 13, 2018.

IPRP dated Aug. 4, 2020 in PCT/US2019/036622.

Hunt, J.B. Find a Load, Make an Offer with Carrier 360: Watch the Video , https://www.jbhunt.com/blog/2017/10/25/ carrier-360-video Oct. 25, 2017.

Hunt, J.B., Carrier 360 Tutorial: Load Board Features [Video], https://www.jbhunt.com/blog/2018/03/01/360-load-board-features Mar. 1, 2018.

Hunt, J.B., Carrier 360 Tutorial: Creating Favorite Lanes [Video] https://jbhunt.com/blog/2018/04/13/carrier-360-favorite-lanes/ Apr. 13, 2018.

Hunt, J.B., Booking & Dispatching Loads https:// www.jbhunt.com/blog/2018/05/22/carrier-360-dispatching-freight/ May 22, 2018.

Hunt, J.B., Simpler is Better: Easy check calls and automated detention, https://www.jbhunt.com/ blog/2018/11/19/ check-calls-detention-carrier-360 Nov. 19, 2018.

Hunt, J.B., Eight Things you can do using your J.B. hunt 360 account, https://www.jbhunt.com/blog/ 2017/06/13/jbhunt-360, Jun. 13, 2017.

Hunt, J.B., Get your next load recommendation from J.B. Hunt 360, https://www.jbhunt.com/blog /2017/08/02/360-load-recs/ Aug. 2, 2017.

Hunt, J.B., Loads Delivered to You: Three Ways to Find Loads Using Carrier 360 by J.B. Hunt, https:// www.jbhunt.com/blog/2017/09/28/find-loads-carrier-360/ Sep. 28, 2017.

Hunt, J.B., Carrier 360 Introduces I'm Not Driving Mode, https://jbhunt.com/blog/2019/06/03/carrier-360-introduces-im-not-driving-mde/ Jun. 3, 2019.

Kuebix, White Paper, Effectively Managing Big Data in Your Supply Chain: How to take action now that will ensure success in the figure.

* cited by examiner

FREIGHT VEHICLE MATCHING AND OPERATION

TECHNICAL FIELD

Examples described herein relate to freight vehicle matching and operation.

BACKGROUND

Freight vehicles generally comprise of a truck and trailer. While the use of freight vehicles for transportation of goods and services is a critical aspect of society, the manner in which freight vehicles are utilized can be inefficient, due to factors such as lack of communication and centralized management of freight vehicles.

DETAILED DESCRIPTION

Figure 1:
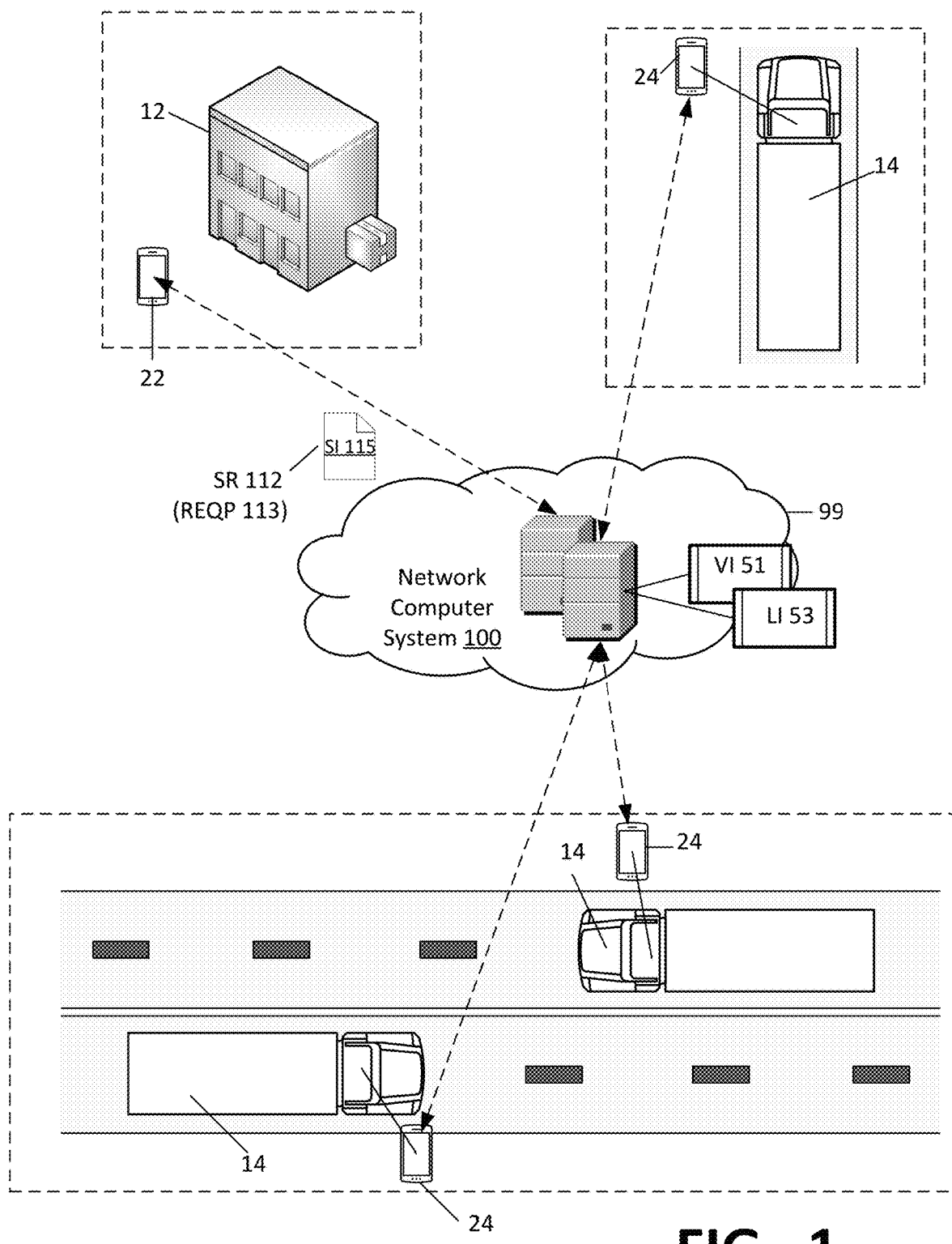
FIG. 1 illustrates a network computer system to match freight vehicles to freight load requests, according to one or more examples.

According to examples, a network computer system implements a freight matching service to monitor and match freight vehicles with new loads. Examples match freight operators to new freight loads by determining the amount of additive travel or cost that individual freight operators would incur in traveling to the loading locations of respective new freight loads.

With respect to examples, the "amount of additive travel" and the "amount of additive cost" refer to quantities that a freight operator incurs, or would likely incur as a result of traveling to a specified loading location. As described, examples can determine the amounts of additive travel and/or cost when matching freight operators to new freight loads, to lower the operating cost for matched freight operators. Among other benefits, the network computer system can reduce the amount of time and resources (e.g., computational resources) that would otherwise be used to match new freight loads to freight operators by prioritizing matching of new freight loads to freight operators with the lowest additive travel and/or cost. In such examples, the prioritized matchings are more likely to be successful, causing the network computer system to expend less computation resources when matching freight operators to new freight loads.

In some examples, a network computer system operates to monitor a location of multiple freight vehicles. For each freight operator of a candidate set, a determination is made as to the amount of additive travel and/or cost that the freight operator would likely incur in traveling to a loading location of a new freight load. The network computer system implements a matching process to match the freight load with one of the freight operators of the candidate set. The network computer system also determines a shipment value for transporting the freight load, based on the additive amount of additive travel or cost which the freight operator is to incur. In some examples, the network computer system directs the matched freight operator to the loading location, using a device of the matched freight operator. One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1 illustrates a network computer system to match freight vehicles to freight load requests, according to one or more examples. According to examples, a network computer system 100 implements a freight matching service to match new freight load requests with freight operators. In particular, the network computer system 100 can implement a freight matching service based at least in part on a determination of additive cost which matched freight operators would incur as a result of traveling to the site of a new freight load request.

According to examples, the network computer system 100 can be implemented in a variety of computing environments, including as part of a network service provided through one or more servers. The network computer system 100 may be implemented on a server, on a combination of servers, and/or on a distributed set of computing devices which communicate over a network 99, such as the Internet. In some examples, the network computer system 100 is implemented using mobile devices of users, including operator devices 24 and/or shipper devices 22. In such examples, the individual mobile devices may execute a corresponding service application that causes the respective mobile device to operate as an information inlet and/or outlet for the network computer system 100.

Over a given territory, the system 100 can communicate with a collection of operator devices 24 that are individually located within corresponding freight vehicles 14. In some examples, each freight vehicle includes a truck (or tractor) and trailer, with the trailer being separable from the truck. In variations, each freight vehicle 14 can correspond to any vehicle that is capable of carrying a load or other type of freight load.

In some examples, the operator devices 24 correspond to mobile devices of freight operators. For example, at least some of the operator devices 24 can be implemented as a multi-functional messaging and/or telephony device of the freight operator (e.g., feature phone, smart phone, phablet, tablet, ultramobile computing device, etc.). In variations, individual operator devices 24 implement respective service applications which communicate with the system 100. In communicating with the system 100, the individual respective operator devices 24 access geo-aware resources of the computing device, such as a respective satellite receiver (e.g., Global Positioning System ("GPS")) which determines longitude and latitude of the operator device 24 over repeated intervals. The individual operator devices 24 may also execute the service applications to access other types of data, such as sensor data obtained from an accelerometer, gyroscope, inertial mass unit ("IMU") or other type of sensor device.

As an addition or alternative, at least some of the operator devices 24 can communicate with corresponding electronic logging devices (ELD) that are resident within the respective freight vehicles. By way of example, individual operator devices 24 can execute the corresponding service application to interface and obtain logging information from the ELD of the respective freight vehicle 14. The logging information may, for example, record hours in which the freight vehicle has been operated, as well as other kinds of information (e.g., telemetry information as measured by integrated sensors of the freight vehicle).

The system 100 programmatically monitors freight operators (or freight vehicles) that are active in operating freight vehicles over a given territory. According to examples, the system 100 communicating with operator devices 24 of freight operators. For example, the system 100 monitors freight operators through communications with respective operator devices 24 which freight operators may carry within their respective vehicle. The system 100 can communicate with operator devices 24 to obtain vehicle information 51, where the vehicle information 51 includes location data that identifies the current location of the respective vehicle. As an addition or alternative, the system 100 communicates with the operator devices 24 to obtain logging information 53 from corresponding freight vehicles 14. The logging information 53 may be obtained from, for example, the operator device 124, or alternatively from the resident ELD of the freight vehicle 14. The logging information may identify, for example, information about the operation of the corresponding freight vehicle, such as information from which fuel efficiency can be determined. As an addition or variation, the logging information 53 may identify a continuous interval during which the vehicle was in operation. Such information may be used to monitor the number of hours during which a freight operator has continuously operated a freight vehicle. The system 100 can aggregate and store vehicle information 51, logging information 53 and various other kinds of information.

In variations, the system 100 maintains a profile that is associated with each freight operator and/or freight vehicle 14, where the profile can indicate an availability or capability of the corresponding vehicle. In some examples, system 100 develops or maintains profiles for freight operators (or carriers) and/or freight vehicle 14 based on aggregated vehicle information 51 and/or logging information 53, as well as other information (e.g., user account information). Among other types of information, the profile maintained by system 100 in association with a given freight operator can include (i) information that tracks freight operator on an existing route; (ii) information that identifies the existing load (if any) being carried within a respective trailer of the freight operator's vehicle; (iii) the type of freight vehicle and/or trailer that the freight operator is utilizing (e.g., whether the freight vehicle can carry wide-load or hazardous material, the power of the vehicle); and/or (iv) a consecutive interval of time during which the freight operator has been operating the respective freight vehicle 14. The system 100 may use the profile information to predict or otherwise anticipate the freight vehicle's route in an upcoming interval of time, as well as the availability or capability of the freight vehicle to transport specific freight loads.

In some examples, system 100 receives a freight load request 112 from a shipper 12 (e.g. via shipper device 22), where the freight load request 112 specifies a load for transport from the shipper's site to a delivery destination. The freight load request 112 can specify request parameters 113, such as (i) a loading time interval, specifying when loading can take place, (ii) information about the new load ("load information 115"), (iii) a delivery time interval when the loaded load can be unloaded at the delivery location, and/or (iv) other restrictions. Each of the loading and delivery time intervals may specify an initial time and a final time, so as to at least partially define the stated time interval. By way of example, the shipper 12 can specify that a new load is available for loading immediately during an upcoming time interval, or at an interval that begins at a particular time (e.g., in four hours, at specific time of day or next day). Still further, the loading time interval can specify a loading time that begins at a defined time and is subject to a restriction of a delivery time or window. The time interval for delivery (or unloading) can similarly specify a window of time in a given day during which delivery of the load would be acceptable. The load information 115 of the new freight load request 112 can specify, for example, a type of load which requires a specific capability of a trailer or vehicle (e.g., wide-load, hazardous material). More generally, the load information 115 can specify a size (e.g., volume, weight) or characteristic (e.g., partial load) of the load that is to be shipped.

The system 100 operates to match the new freight load request 112 to a freight operator. In matching the freight load request 112 to a freight operator, the system 100 implements operations to minimize additive cost associated with a matched freight operator traveling to a loading site (e.g., site of shipper warehouse) to pickup a new load of freight load request 112. In determining additive cost, the system 100 can determine an additive travel distance and/or duration ("additive amount of travel") for individual freight operator to travel to the site of the load. With respect to examples described, the additive travel distance or duration (or "additive amount of travel") corresponds to a travel distance or time for a freight operator to travel to a site of a shipper 12 from a given departure point, where the given departure point is a current or likely future location of the freight operator.

According to some examples, system 100 determines an additive cost for one or more freight operators, reflecting a cost of additive travel as well as other factors (e.g., additional inefficiencies associated with operating the freight vehicle) associated with the freight operator traveling to the site of the shipper. The system 100 can also determine a shipment value for new freight load requests, where the shipment value includes a surcharge value that reflects the additive cost associated with individual freight operators traveling to the site of the shipper 12 for the new freight load request 112. As individual freight operators may have different amounts of additive travel which they may incur to load a load of a new freight load request 112, the system 100 may assign different surcharge values to different freight operators for fulfilling the same freight load request. In such examples, the determination of the surcharge value can be based on the distance and/or time of travel for the respective freight operators to reach the site of the shipper. Accordingly, a shipment value assigned for fulfilling the new freight load request 112 can vary amongst a group of candidate freight operators who are in sufficient proximity to the load site to accept the freight load request 112.

In determining the additive amount of travel, system 100 may utilize at least one of (i) a departure point corresponding to the current location of a candidate freight vehicle, or (ii) a likely future location of the candidate freight vehicle. In determining the likely future location, system 100 can project the future locations of the freight operator using routing or contextual information. By way of example, system 100 can predict a future location of a freight operator based on a planned route or known destination of the freight operator. As another example, once the system 100 assigns a freight load request to a freight vehicle, the system 100 can update a freight operator profile associated with the freight vehicle to reflect the destination of the freight vehicle. Subsequently, the system 100 can predict the location of the freight vehicle at a future point in time, based on route information, delivery information or other monitoring or tracking activities which can be performed in conjunction with the freight operator transporting a previously assigned load. Still further, the system 100 can provide, or otherwise integrate with a route planning service for individual freight operators, in order to facilitate the freight operators in navigating the respective freight vehicles to delivery destinations or other locations. In variations, the system 100 can also utilize contextual information, such as by way of determining a suitable point on a highway where the freight operator can change directions and travel towards the site of the shipper 12.

By way of examples, the system 100 may receive a new freight load request 112 which specifies an immediate or soonest available loading time for a new load that is located at a site of a shipper. The system 100 can determine the additive amount of travel by anticipating a direct route between the current or likely future location of a candidate freight operator and the site of the load. In variations, the freight load request 112 may provide for a future loading time interval (e.g., next 8 hours, next day between 10 AM and 2 PM, etc.) during which loading may take place. For future loading time intervals, the system 100 determines the additive distance of travel for the candidate freight operator by determining a likely future location for that freight operator, given information determined from the profile associated with the freight vehicle, such as the current route of the freight operator. Still further, in other variations, system 100 determines the likely point of departure for candidate freight vehicles as being the point in the freight operator's existing or predicted route, at which point travel to the load site can be minimized.

In some examples, the system 100 implements a matching process to match a new freight load request with a freight operator based on factors that include a determination of the additive cost associated with loading the load of the new freight load request 112 in a corresponding freight vehicle 14. As candidate vehicles for handling new freight load requests have differing locations with respect to the site of the respective shipper, the determination of additive cost for assigning the new freight load request to each of the candidate freight operators may differ.

In some variations, the system 100 can implement an objective to minimize the additive cost that would otherwise be incurred by a freight operator that travels to load a load of a new freight load request. In examples, the system 100 can prioritize selection of freight operators for the freight load request 112 who are expected to have the least amount of additive travel to the load site. As an addition or variation, the system 100 can associate different levels of priority to different freight operators for the freight load request 112, based on the expected amount of additive travel for the respective freight operators to the load site. The prioritization of freight operators can be reflected by, for example, the timing in which the respective freight operators are provided information about the new load (e.g., closest freight operator can accept new freight load request 112 before other freight operators who may be relatively further away).

In some examples, system 100 can determine an initial value for the freight load request 112, based on a first threshold distance range (e.g., within 75 km of load facility) for the additive travel distance. The system 100 can then perform a first matching process to match the freight load request 112 to freight vehicles that are determined to require an additive amount of travel that is less than the first threshold distance range. If the freight load request 112 is not matched to a freight vehicle, the system 100 can determine a second threshold distance range (e.g., within 150 km of load facility) for the additive travel distance, and the system 100 performs a second matching process to match the freight load request 112 to freight vehicles that are determined to require an additive travel distance that is less than the second threshold distance range. The system 100 can repeat the matching process until a freight vehicle is matched to the freight load request 112. Parameters such as the value of the threshold ranges, and the granularity between minimum threshold ranges can be varied based on factors such as an estimated number of freight vehicles in a vicinity of the shipper. In variations, the threshold distance ranges may also be varied, based on factors such as the average distance of travel for freight operators that are in the vicinity of the load facility. Thus, for example, the additive cost for the first selection of freight operators may be based on an average distance of travel for each of the freight operators to the load site (e.g., based on current location).

In variations, system 100 may offer the freight load request 112 to multiple freight operators, based on a shipment value of the freight load request that includes (i) a shipment value, corresponding to the value the shipper assigns for transporting the respective load from the load site to the destination; and (ii) a surcharge value that is based on the determination of additive cost associated with the matched freight operator traveling to the load site. In such variations, the shipment value provided to individual freight operators may vary based on a determination of additive cost that is specific to each of the freight vehicles. For example, the freight operator can operate the operator device 124 to view a job screen, where the freight load request 112 is rendered, along with a carrier specific shipment value that accounts for the additive cost of the freight operator to travel to the load site.

Depending on implementation, the additive cost associated with the freight load request 112 can be based on at least one of (i) the current location of the respective freight operator, (ii) a likely location of the freight operator in a future time interval where travel and timely pickup of the shipper's load can be made. In variations, the additive cost can be determined from the current location of the freight operator, such that the shipment value that would be provided to a given freight operator can change over time.

Figure 2:
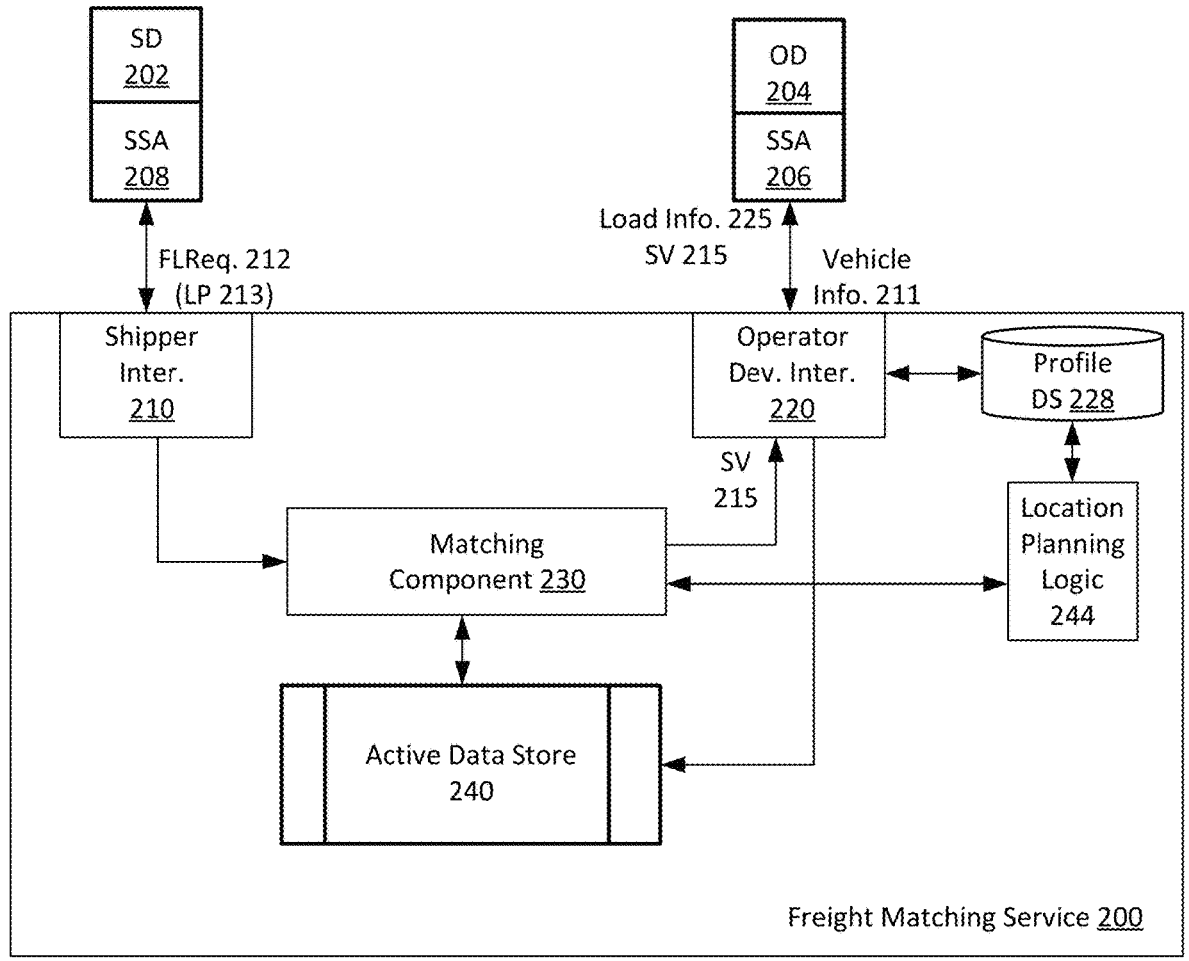
FIG. 2 illustrates an example freight matching service provided by a network computer system, such as described with an example of FIG. 1.

FIG. 2 illustrates an example freight matching service provided by a network computer system, such as described with an example of FIG. 1. With reference to an example of FIG. 2, a freight matching service 200 can be implemented by, for example, network computer system 100 to match freight vehicles to freight load requests. As described, the service 200 can perform the matching in a manner that accounts for additive costs to freight vehicle operators that travel to the site of the shipper to load a new load.

With further reference to an example of FIG. 2, the freight matching service 200 includes a shipper interface 210, the operator device interface 220, and a matching component 230. The shipper interface 210 can be implemented as a communication interface for shippers. In an implementation, the shipper interface 210 provides a web-based portal or other form of programmatic interface, from which shippers can generate new freight load requests 212. In an example of FIG. 2, the shipper interface 210 communicate with a shipper device 202 on which a shipper service application 208 executes. A shipper can, for example, interact with the service application 208 to generate a new freight load request 212, where the new freight load request specifies load parameters that include a loading time interval, a load site (or location where load is to be loaded), a delivery location, and a delivery time interval.

The operator device interface 220 communicates with mobile devices of freight operators (as represented by the operator device 204), on which a respective service application 206 executes. The service application 206 can execute on the operator device 204 to, for example, automatically obtain and transmit various types of vehicle information 211. In some examples, the shipper interface 210 and the operator device interface 220 can each include or use an application programming interface (API), such as an externally provider-facing API, to communicate data with the shipper device 202 and the operator device 204, respectively. By providing the externally facing API, the service 200 can establish secure communication channels via secure access channels over the network through any number of methods, such as web-based forms, programmatic access via RESTful APIs, Simple Object Access Protocol (SOAP), remote procedure call (RPC), scripting access, and/or other logic.

In examples, the vehicle information 211 includes location data, which the service application 206 can obtain by interfacing with a satellite receiver (or other geo-aware resource) of the operator device 204. In this way, the operator device interface 220 can correlate, or otherwise determine a current location of the freight vehicle (or freight operator) based on the location data provided as part of the vehicle information 211. As an addition or variation, the service application 206 interfaces with other types of resources, such as one or more movement sensors (e.g., accelerometer, gyroscope) to determine movement information (e.g., via accelerometer sensor), as well as environmental sensors (e.g., barometer, thermometer) to determine respective types of environmental information (e.g., barometric information, temperature information, etc.).

In examples, the service application 206 can identify the freight operator or carrier, as well as the freight vehicle that the freight operator is operating. As described with some examples, the service application 206 can communicate with an ELD of the freight vehicle to obtain a VIN or other identifier of the freight vehicle. In variations, the freight operator may capture an image or otherwise manually enter the identifier of the freight vehicle. In this way, the service application 206 can associate operator devices 204 with respective freight operators and freight vehicles, even in situations where the freight operator operates more than one freight vehicle over a given time frame.

The service application 206 can also process input or other information that indicates a service state of the freight vehicle. For example, the service application 206 may record input and/or other activity of the freight operator to identify the state of the freight vehicle as being available (e.g., trailer of freight vehicle is empty or partially full) or unavailable (e.g., trailer of freight vehicle is full) for transporting a new load. In some examples, the service application 206 may also execute to record a state of the freight operator, based on a determination of a continuous time interval during which the freight operator has operated the freight vehicle. If, for example, the freight operator nears or exceeds 8 hours of continuous service when operating the freight vehicle, then the service 200 may identify the freight operator as being unavailable for matching to freight load requests which would otherwise cause the freight operator to drive the freight vehicle to the site of the load during a time interval that would otherwise be designated for resting.

In some variations, the service application 206 can execute on the operator device 204 to communicate with resources that are integrated with, or otherwise associated independently with the freight vehicle. In this way, the vehicle information 211 can include sensor information, user input, state information and/or other information which can be obtained and/or determined on the operator device 204. By way of example, the service application 206 may communicate with the ELD of the freight vehicle, to obtain ELD logging information, as well as vehicle telemetry information, such as engine state, odometer readings, and various types of sensor information of the vehicle.

As an addition or variation, the service application 206 may implement processes to determine, for example, the state of the freight vehicle or operator based on the data obtained from the ELD. Alternatively, the service application 206 can communicate the ELD information to the service 200 via the operator device interface 220. In turn, the service 200 can utilize the ELD information to determine the state of the freight vehicle or freight operator. Similarly, the service application 206 can communicate with sensors that are integrated or otherwise provided with the trailer, tires, or other components of the freight vehicle. Processes of the service application 206 and/or freight matching service 200 can utilize sensor information to determine, for example, whether the freight vehicle is available to carry an additional load based on an estimated size or weight of an existing load carried within the trailer of the freight vehicle.

In some examples, the operator device interface 220 can access a profile data store 228 to identify a profile for the freight operator and/or freight vehicle. With respect to the freight vehicle, the profile information can identify, for example, a trailer size, a vehicle or trailer type, and/or a fuel efficiency of the freight vehicle. Additionally, the profile information for the freight operator can identify, for example, recent freight load requests which the freight operator has picked up, including open freight load requests that identify the loads which the operator is carrying but not yet delivered. In variations, the profile for the freight operator can identify one or more delivery locations of open freight load requests which the freight operator is in process of delivering. Still further, the profile for the freight operator can identify the number of hours which the freight operator has continuously operated the freight vehicle.

In an example of FIG. 2, the operator device interface 220 can communicate with the operator device 204 via the service application 206 to receive updated vehicle information 211 pertaining to the freight vehicle that a respective freight operator is operating. The operator device interface 220 can store the vehicle information 211 in an active data store 240, which the operator device interface 220 updates through communications with multiple active freight operators in a given territory or region. For example, the operator device interface 220 can update a record associated with the freight operator or vehicle, based on the vehicle information 211. The operator device interface 220 can also record, with the active data store 240, updated location information (e.g., current location) provided by multiple operator devices, for respective freight vehicles that are operated within a territory or given geographic region.

In variations, the operator device interface 220 can also record relevant profile information along with updated information for individual freight operators. In this way, the record that is associated with each freight operator can identify a current location of the respective freight vehicle, as well as other information determined from the profile data store 228. For example, the operator device interface 220 may associate a capability of the freight vehicle with the associated record of the respective freight operator.

The shipper interface 210 can communicate with the shipper device 202 (or shipper interface) to receive a new freight load request 212. The freight load request 212 can specify parameters such as a load location and a delivery location. The freight load request 212 can also specify a pickup time or time interval, as well as a delivery time or time interval when the load is to be delivered at the delivery location.

The matching component 230 can implement one or more processes to match the new freight load request 212 with a freight vehicle. In examples, the matching component 230 can determine an additive amount of travel for each of multiple candidate freight vehicles. In variations, the matching component 230 can implement logic to determine an additive cost for each of the multiple candidate freight vehicles, where the additive cost is based on the additive travel distance that is determined for the respective freight vehicle, as well as other considerations. In examples, such other considerations for determining the additive cost can be reflected by parameters that represent the terrain that is to be traversed by the respective freight operator to reach the destination, as well as environmental conditions (e.g., inclement weather) which individual freight operators may encounter (or avoid) when traveling to the site of the shipper. As an addition or variation, the matching component 230 may also use profile information from the profile data store 228 to determine additional factors that contribute to the additive cost for individual freight operators. By way of example, the additional factors may include the fuel efficiency of the freight vehicle that the operator is driving, which can be determined from historical information and/or other vehicle profile information (e.g., vehicle type or age).

In some examples, the matching component 230 processes new freight load requests which specify an immediate time interval (e.g., next 4 hours) for loading onto a matched freight vehicle. For such freight load requests, the matching component 230 determines a shipment value 215 for the freight load request 212, where the shipment value accounts for the additive cost to individual freight vehicles when traveling to the site of new load. The shipment value 215 can correspond to a monetary value or consideration, to compensate the freight operator for transporting the load to the delivery location. Similarly, the determination of additive cost to the freight operator can form the basis of a surcharge monetary value or consideration, to compensate the freight operator for deviating from a current location or planned route to the site of the shipper, where the freight load can be picked up.

According to some examples, the matching component 230 implements a matching process by identifying, from the active data store 240, a set of candidate freight vehicles that are within a threshold distance of the load site. In examples in which the loading time for the new freight load is immediate, the matching component can determine the current location of monitored freight operators. For example, a candidate set of freight operators may be determined by comparing a current location of individual freight operators with the shipper's location. In variations in which the loading time is in the future, the loading time interval, and the amount of time provided with the loading time interval can set the threshold range for identifying candidate freight operators. The matching component 230 can determine the threshold cost (or surcharge value) for each freight operator of the candidate, based at least in part on the additive travel which the respective freight vehicle is to incur in traveling to the site of the new load.

Still further, in other examples, the freight matching service 200 can implement location planning logic 244 to predict a location of individual freight operators at a point in time in the future. By way of example, the location planning logic 244 can use profile information from the profile data store 228, (e.g., information about next delivery of freight operator, or current route of freight operator) to determine a planned or likely route or location for individual freight operators. When the freight load request 212 identifies a future time interval, the location planning logic 244 can implement a matching process in advance using the predicted routes and locations of individual freight operators.

As described by various examples, the matching component 230 can further implement a process that prioritizes an objective to minimize an amount of additive travel that will result in fulfilling the freight load request. In some examples, the matching component 230 can implement a process that makes a given load to more likely be matched to a freight operator that satisfies a condition of reduced travel. For example, the process can be implemented to favor an outcome in which new loads are matched to freight operators who have to incur the least amount of additive travel or cost. As another example, the process can be implemented to favor an outcome in which a new load is more likely to match to a freight operator that is within a threshold range of travel from the shipper site. In variations, the prioritization of the matching process can result in outcomes in which communications (e.g., invitations) are successively and sequentially displayed to freight operators based on the respective determinations of additive travel and/or cost. In such variations, for example, the nearest freight operators may receive initial invitations that enable the respective freight operators to accept the freight load request, followed by the next nearest freight operators, until the freight load request is accepted by one of the candidate freight operators. In such examples, the shipping values provided to each freight operator may vary, based on the determination of additive amount or cost for each of the respective freight operators.

In such examples, the matching component 230 can publish information about the freight load request 212 to a candidate set of freight operators, where the published information can specify the freight load request 212, the load parameters 213 and the shipment value (including a surcharge value). As described by examples, the shipment value 215 associated with the freight load request 212 varies for each freight operator of the candidate set. In particular, the shipment value 215 can vary based on the respective location of the freight vehicle as compared with the shipper location of the new freight load request 212. In an implementation, the respective service application 206 of the operator device 204 used by each freight operator of the candidate set may publish load information 225 about the freight load request 212, where the load information 225 specifies a shipment value 215 that is specific to the carrier.

As an addition or variation, the shipment value 215 (as determined and/or published) may be specific to the location of the freight operator, or range of the carrier from the load site. Thus, freight operators that are within a designated region or range of travel (e.g., within 50 km) of the shipment location may be provided a shipment value 215 that is less than the shipment value of other freight operators who are further away from the shipment location.

In some examples, the load information 225 about the new freight load request 212, including the shipment value 215 that accounts for additive cost, may be displayed to the freight operator using an interface generated by the service application 206. In variations, the load information 225 about the new load can be sent to the freight operator as a notification. As described with some examples, a matching process in which freight operators are selected to view shipping information, including a shipping value 215 that accounts for additive cost, can be implemented with an objective to reduce an additive cost of the matched freight operator. In particular, the matching process may be implemented to have an outcome that favors matching of freight loads to freight operators who are deemed to be closest, or to have the least additive cost associated with driving their respective freight vehicles to the site of the shipper for the new loads.

When freight operators are matched, the freight matching service 200 can implement operations to direct the matched freight operator to the loading location, as specified by the freight load request 212. By example, the matching component 230 can trigger the operator device interface to send a communication 235 (e.g., notification) that identifies the load and/or loading location. In variations, the communication 235 can include a navigation instruction for enabling the freight operator to efficiently reach the loading location. By of example, the matching component 230 and/or location planning logic 244 can identify a departure point for the freight operator that minimizes the amount of additive travel which the freight operator is to incur in driving the respective freight vehicle to the loading location. The departure point can be determined from, for example, determining an existing route (or planned destination) of the freight vehicle, and using the route planning logic (e.g., via an external map service) to plan a route that minimizes the overall travel distance or time.

While some examples are described in context of an individual load transport request 212, freight matching service 200 can also be implemented to manage a quantity of loads on a scheduled basis (e.g., daily), on behalf of a shipper or shipment facility. For example, the system 100 can schedule freight operators to transport a varying number of loads for the shipper on a regular (e.g., daily, weekly) basis. In such examples, service 200 can schedule freight operators in advance to transport a designated number of loads for the shipper. For at least some scheduled loads, the freight matching service 200 can schedule freight operators in advance to minimize additive cost by, for example, intelligently routing freight vehicles, and/or by matching freight operators from a larger group of candidates based on a predicted future location of the respective freight operators.

Examples further recognize that the number of loads which the shipper may have to transport at regular intervals can fluctuate, as can the number of freight operators or vehicles. In situations where such fluctuations result in one or more loads being available and unassigned to a freight operator, service 200 may match the unassigned load to an available freight process, using a process that prioritizes the reduction of additive cost.

Figure 3:
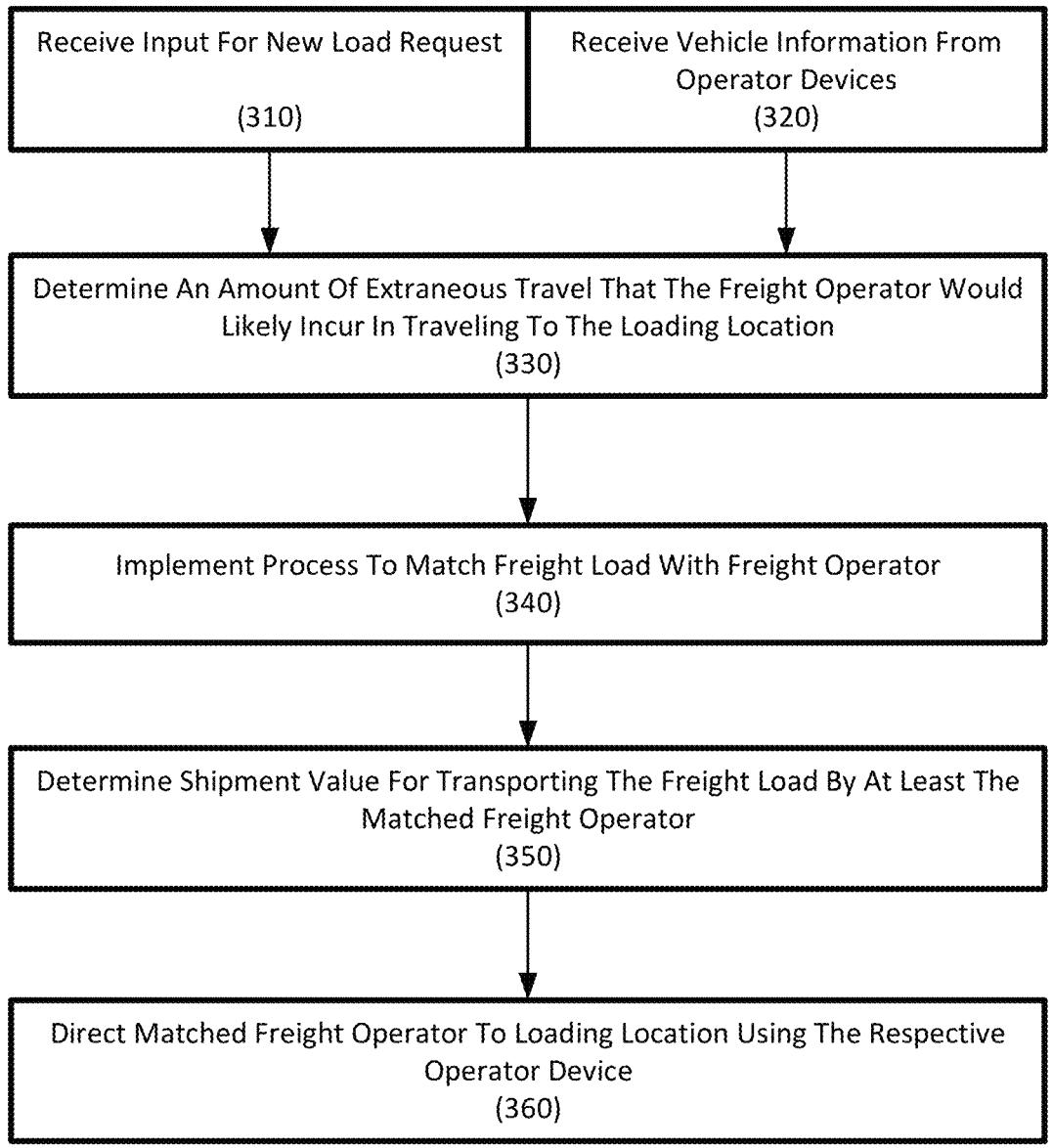
FIG. 3 illustrates an example method for matching a new freight load to a freight operator.

FIG. 3 illustrates an example method for matching a new load to a freight operator, using a network computer system such as described with an example of FIG. 1. For purpose of illustration, an example of FIG. 3 is described in context of a network computer system, such as described with an example of FIG. 1. Accordingly, any reference to an example of FIG. 1 is for purpose of illustrating suitable components for performing a step or sub-step being described.

With reference to an example of FIG. 3, the system 100 receive input to identify a new load request for which a shipper is requesting transport (310). A shipper may specify a freight load request using, for example, a portal or shipper device (e.g., operating a service application). The new load request can specify one or multiple loads, along with a set of load parameters. The set of load parameters can include the shipper location for the specified load(s) (e.g., site of shipper), the delivery location of the new load(s), as well as the loading time interval and the delivery time interval.

The system 100 receives vehicle information communicated from operator devices, corresponding to mobile devices that are carried within the freight vehicles (320). The vehicle information can include location information, from which the system 100 can identify the current location of the respective freight vehicle. In some examples, the vehicle information can also include movement information and/or logging information (e.g., number of hours during which a freight operator continuously operates a freight vehicle).

In some examples, system 100 determines the additive amount of travel which would be incurred by a set of one or more candidate freight operators operating their respective freight vehicles to travel to the shipper location (330). The system 100 may implement a process to match the freight load of the transport request with one of multiple freight providers (340). As described with some examples, the system 100 performs the matching in accordance with an objective to minimize an amount of additive travel and lower the operating cost in fulfilling the freight load request.

In some examples, the system 100 determines a shipment value for transporting the freight load(s) of the new freight load request by at least one freight operator of the candidate set (350). In variations, the shipment value is determined for multiple freight operators of the candidate set. In such examples, the shipment value varies amongst the freight operators based on the respective amount of additive travel that is determined to be required from each of the multiple freight operators in traveling to pickup the new freight load. Moreover, the shipment value may vary amongst one or more freight operators based on additional factors identified from, for example, profile information (e.g., age or fuel efficiency of freight vehicle), or contextual information about the location of the freight operator (e.g., inclement weather, traffic, roadway conditions, hills, etc.).

According to examples, the system 100 directs the matched freight operator to the shipper location of the new freight load request (360). The matched freight vehicle can travel to the shipper location, so as to arrive during a time that is within the specified loading time interval. In some examples, the operator device receives a notification of the assignment, as well as directions to travel to the shipper location. In variations, the operator device can be intelligently navigated to the shipper location of the new freight load request. Still further, in other variations, the system 100 can be provided a planned route that navigates the freight vehicle to the shipper location.

Upon fulfillment of the freight load request, the system 100 can transfer a monetary credit to an account of the freight operator, based on the shipment value determined for the new load. As described with some examples, the shipment value can be based on a base or transport value, as well as a surcharge which accounts for the amount of additive travel and other additive costs incurred as a result of the freight operator driving to the shipper location.

Figure 4:
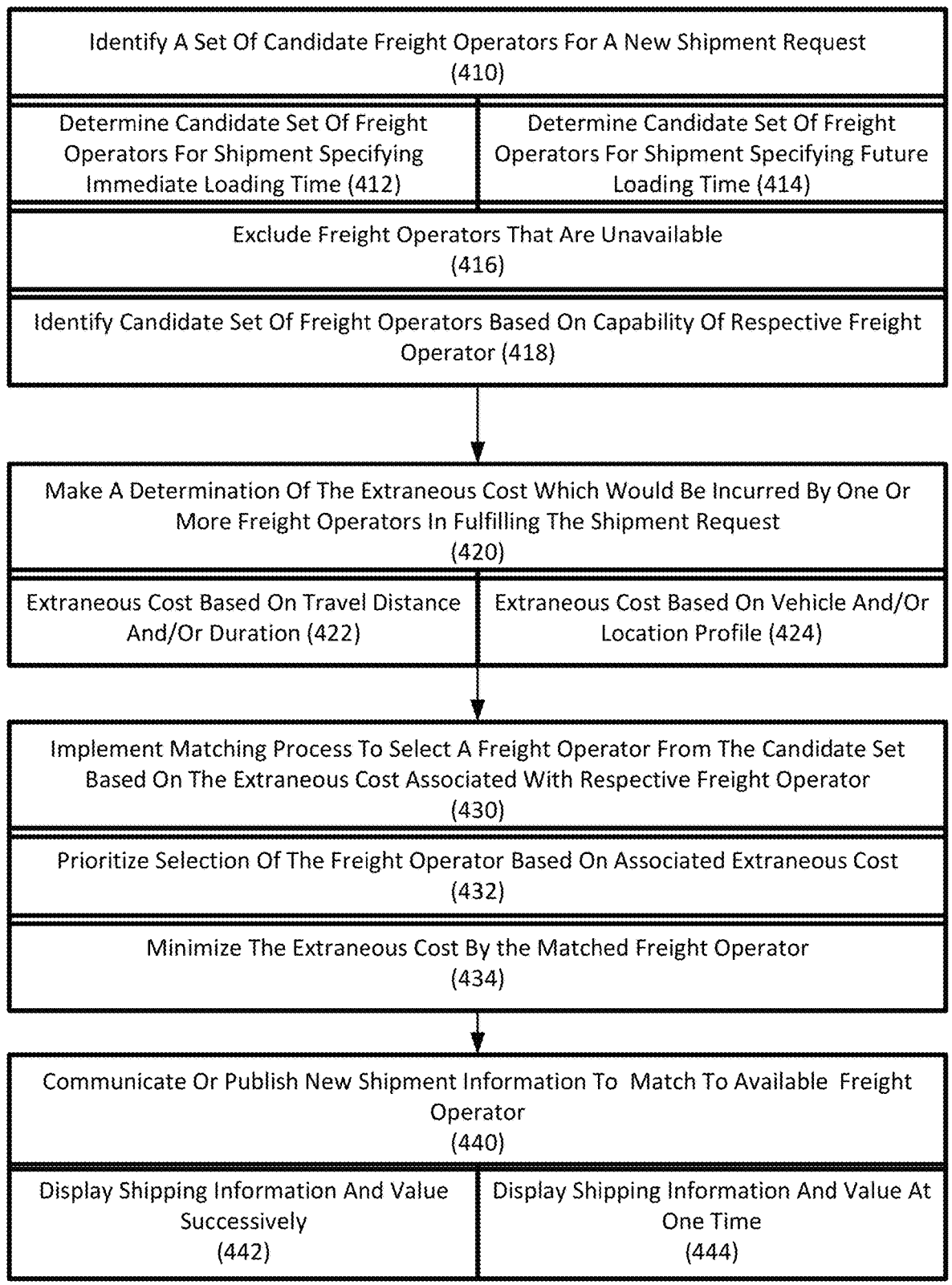
FIG. 4 illustrates examples of matching processes for matching a load of a new freight load request to a freight operator, based on a determination of additive cost for individual freight operators.

FIG. 4 illustrates examples of matching processes for matching a load of a new freight load request to a freight operator, based on a determination of additive cost for individual freight operators. For purpose of illustration, an example of FIG. 4 is described in context of freight matching service, such as described with an example of FIG. 2. Accordingly, in describing an example of FIG. 4, reference may be made to elements of an example of FIG. 2 for purpose of illustrating suitable components for performing a step or sub-step being described.

With reference to FIG. 4, once the freight matching service 200 receives a new freight load request, the matching component 230 implements a matching process that is based on a determination of additive cost for one or more candidate freight operators. In an example, the matching component 230 identifies a set of candidate freight operators (410). In examples in which the new freight load request is immediate (e.g., same day, within next 4 hours, etc.), the candidate freight operators may correspond to freight operators who are determined to be in a first designated threshold vicinity of the shipper's location (412). In such examples, the matching component 230 may access the active data store 240 to identify those freight operators who have a current location that is within a geographic region of the site of the shipper.

In variations, the freight load request can specify a loading time for the new freight load request that is outside a threshold of immediacy (e.g., next day), and the matching component 230 can implement a matching process to accommodate the future loading time (414). In an implementation, when the shipper specifies a future loading time, the matching component 230 can schedule a corresponding future point in time that precedes the future loading time interval, at which time the matching process can be initiated and performed. The determination of the future point in time from which the matching process can be initiated can be based on a variety of factors, such as historical information (e.g., average amount of time for system 100 to locate freight vehicle for shipper in prior instances) and a number of available freight operators and/or new freight load requests in a relevant geographic region of the shipper.

In variations, when the shipper specifies a future loading time, the matching component 230 can implement the matching process in advance of a travel time needed by candidate freight operators to reach the site of the shipper. For example, the system 100 can receive a new freight load request for loading on the next day. The matching component 230 may then initiate the matching process a day in advance. In such variations, the matching component 230 can identify a second threshold vicinity of the shipper location, which can be based on, for example, a maximum travel distance or time that can be expected from a freight operator until the future loading time arrives. In such variations, the system 100 may utilize location planning logic 244 to determine a likely route or location of individual freight operators over a given interval of time (e.g., next 24 hours). The location planning logic 244 can utilize the profile information of the freight operator and/or vehicle, to determine a likely route of travel for individual freight operators over a given future time interval (e.g., over next 24 hours). For example, the location planning logic 244 can use the freight operator's profile information to (i) identify likely delivery locations of a given freight operator based on identification of other loads which the given freight operator is in process of delivering; (ii) a planned navigation route, based on a navigation guide which the freight operator is utilizing (e.g., via the service application 206, or through another service which the service application 206 can interface with); and/or (iii) an expected number of hours in which the freight operator is to operate the freight vehicle, based on logging information from the freight operator's vehicle.

In determining the candidate set of freight operators, the matching component 230 may exclude freight operators that are deemed to be unavailable (416). Unavailable freight operators can include those freight operators which would otherwise be deemed available, based on their respective location at the time when the candidate set is identified. The determination that freight operator unavailable may be based on profile information associated with the freight operator. The profile information can identify, for example, (i) freight operators who have a full trailer (e.g., based on profile information recording the freight operators loading and unloading); and (ii) freight operators who are located, or otherwise traveling in a direction that makes transport to the loading location impractical. As an addition or alternative, the freight operator's profile information can also exclude those freight operators who have insufficient time remaining before a mandated rest period to reach the shipper's site during the loading time interval, or otherwise complete the transport of the load on time.

As an addition or variation, the matching component 230 identifies the candidate set of freight operators based on a capability of the respective freight vehicles (418). For example, the matching component 230 may access the vehicle profile information of individual freight operators, in order to determine whether the capability of the respective freight operator's vehicle is a match for a requirement of the new load. For example, if the new load is excessively heavy, requires hazardous containment, or has other requirements, the matching component 230 can exclude those freight operators who are operating vehicles that lack the requisite or preferred capability.

According to examples, the matching component 230 makes a determination of the additive cost which would be incurred by one or more candidate freight operators in fulfilling the freight load request (420). The determination of additive cost can be based on the additive amount of travel for the respective freight operator (422). The determination of the additive amount of travel can be based on, for example, a current location of each freight vehicle of the candidate set. For example, the freight load request may specify that a new load is available immediately for a carrier (e.g., same day, within a few hours, in the next two hours, etc.). As an addition or variation, the additive amount of travel can be based on a likely location of the freight vehicle at a point in time in the future.

In variations, the determination of additive cost can also be based on a vehicle profile (e.g., a fuel efficiency of an identified freight vehicle) or location profile of the carrier's current location (424). By way of example, the location profile can identify traffic patterns which may lengthen the freight operator's travel time. As an addition or variation, the location profile can identify roadway conditions (e.g., hilly travel for particular freight operator) or environmental conditions that could impact a particular freight operator above a typical travel route. The matching component 230 can further identify location profile information which would disproportionately impact one or more freight operators of the candidate set over other freight operators who are within a threshold vicinity of the site of the shippers of the candidate set. For example, the location profile can identify a condition that would disproportionately impact one freight operator over another within the vicinity of the load site (e.g., one freight operator would be driving against traffic or into inclement weather).

The system 100 can implement a matching process to select a freight operator from the candidate set based at least in part on the determined additive cost associated with one or more of the freight operators of the candidate set (430). In some examples, the matching component 230 implements a matching process that prioritizes selection of the freight operator based at least in part on the determined additive costs associated with one or more of the freight operators of the candidate set (432). In an example, the matching component 230 prioritizes the selection of freight operators with an objective of minimizing additive cost to the matched freight operator (434). For example, the matching component 230 may initially publish the shipment value to include an additive cost that is based on a determination of any one of (i) the lowest additive cost for any freight operator of the candidate set; (ii) an average of the additive cost for multiple freight operators of a statistical sample or size sample; and/or (iii) a predetermined threshold that accounts (e.g., is greater than) the additive cost associated for at least one of the freight operators of the candidate set. The publication of the load information and determined shipment value (including additive cost) can be limited to a select set of the candidate freight operators.

In examples, the matching component 230 can communicate or otherwise publish new load information to match to an available freight operator in accordance with the prioritization objective of minimizing the additive cost (440). In examples, multiple freight operators of the candidate set may view load information, along with a shipment value (including a surcharge that is based on a determined additive value), as part of the matching process. For example, individual freight operators may utilize the service application 206 to view load information and shipment value as an offer which they can select to accept. Alternatively, the system 100 can communicate a notification or other message to individual freight operators of the candidate set, in order to inform the receiving freight operator about the new load. In such examples, the shipment value may differ amongst at least some of the freight operators based on the determination of the additive cost associated with the respective freight operator of the candidate set.

In examples, the load information and shipping value can be successively revealed or otherwise communicated (e.g., by notification, display through an offer interface of service application 206, etc.) to select freight operators of the candidate set over a given time period (442). In such examples, the freight operator(s) having the least additive cost for matching to the new load receives content that is displayed on, for example, the respective operator device 204. For example, the content may be delivered as a notification or application content. After passage of time, the freight operator (or set of freight operators) having the next least additive cost determination for transporting the new load is provided content for the new load (e.g., as a notification or via the application). Thus, the load information and the value for the new information can be displayed or otherwise provided, in successive fashion, to one or more freight operators in accordance with a timed sequence, where the timed sequence is based on the respective additive cost which those freight operators are estimated to incur in traveling to the shipper site. By making the new load available in successive fashion and in accordance with a timed sequence, the freight matching service 200 can implement prioritization to further an objective of minimizing the additive cost associated with matching the new load to an available freight operator.

In variations, sets of one or more freight operators can be provided with the shipping information and shipping value of a new load in successive fashion, with each set of freight operators being determined by threshold ranges of additive travel (e.g., within 50 KM). Thus, for example, the shipping information and shipping value can be displayed to freight operators for which the amount of additive travel is less than a first threshold (e.g., 100 km or 1 hour of travel). If no match is identified for the freight load request, the shipping information and shipping value can be displayed to freight operators for which the amount of additive travel is less than a second threshold (e.g., 150 km or 1.5 hours of travel). The successive process to match the freight load request to a freight operator can be continued successively, and in accordance with a timed sequence, for each of the identified threshold ranges of travel. With respect to such examples, the determination of the threshold ranges of additive travel can be predetermined and based on, for example, historical values and/or an average or representative additive travel distance or time. Moreover, in variations, the additive cost that is assigned to each freight operator for being matched to the new freight load request can be equalized to be the same for each freight operator that falls within one of the predetermined thresholds.

While some examples provide for a successive and sequenced process to provide freight operators with the shipping information and value for a new load, in variations, the shipping information and value can be displayed to multiple freight operators at once (444), with the shipping value provided to some freight operators being different than the shipping value provided to others. As described with other examples, the determination of the shipping value for each of the respective freight operators may be based on the amount of additive travel and/or cost associated with each of the freight operators. Thus, for example, a first freight operator who is determined to have the least additive travel value for accepting the new load may be provided information about the new freight load request at the same time as a second freight operator who is determined to have a greater amount of additive travel value as a result of being further away from the site of the shipper. In such an example, the shipping value (which includes the additive cost as determined for the freight operator) for the first freight operator may be determined to be different than the shipping value for the second freight operator.

Figure 5:
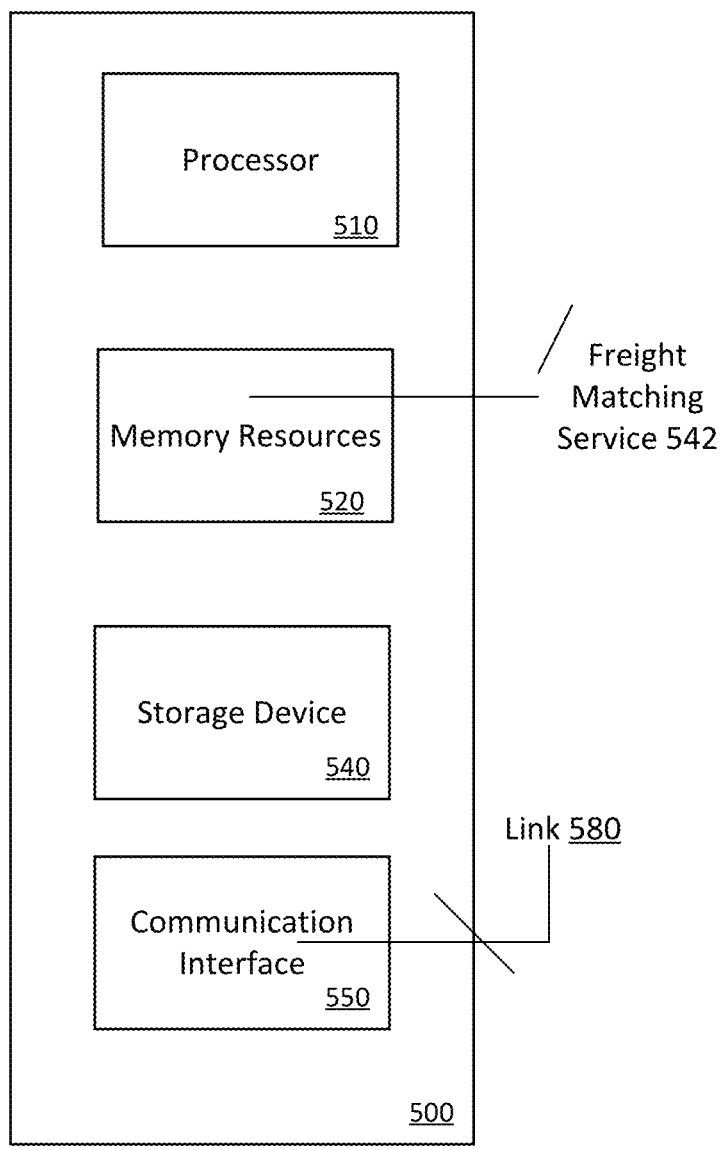
FIG. 5 illustrates a block diagram for a computer system on which examples described herein may be implemented.

FIG. 5 illustrates a block diagram for a computer system on which examples described herein may be implemented. For example, in the context of FIG. 1 and FIG. 2, network computer system 100 and/or freight matching service 200 may be implemented using a computer system or combination of computer systems, such as described by FIG. 5.

In one implementation, the computer system 500 includes one or more processors 510, memory resources 520, and a communication interface 530. The computer system 500 includes at least one processor 510 for processing information. The memory resources 520 may include a random access memory (RAM) or other dynamic storage device, for storing information and instructions to be executed by the processor(s) 510. The memory resources 520 also may be used for storing temporary variables or other intermediate information during execution of instructions to be executed by the processor(s) 510. The computer system 500 may also include other forms of memory resources, such as static storage devices for storing static information and instructions for the processor 510. The memory resources 520 can store information and instructions, including instructions 542 for matching freight operators to minimize additive costs associated with travelling to the site of the new freight loads for shipment. Additionally, the processor(s) 510 can execute the instructions 642 to implement a method such as described with examples of FIG. 3 and/or FIG. 4.

The communication interface 530 can enable the computer system 500 to communicate with one or more networks 580 (e.g., cellular network) through use of the network link (wireless or wireline). Using the network link, the computer system 500 can communicate with one or more other computing devices and/or one or more other servers or data centers. In some variations, the computer system 500 can receive device data and/or service-specific information from operator devices (e.g., operator device 204) and shipper devices (e.g., shipper device 202) via the network 580 to facilitate determination of additive cost amongst freight operators, and matching of freight operators to new freight loads for shipment.

Examples described herein are related to the use of the computer system 500 for implementing the techniques described herein. According to one embodiment, those techniques are performed by the computer system 500 in response to the processor 510 executing one or more sequences of one or more instructions contained in the memory resource 520. Such instructions may be read into the memory resources 520 from another machine-readable medium, such as the storage device. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
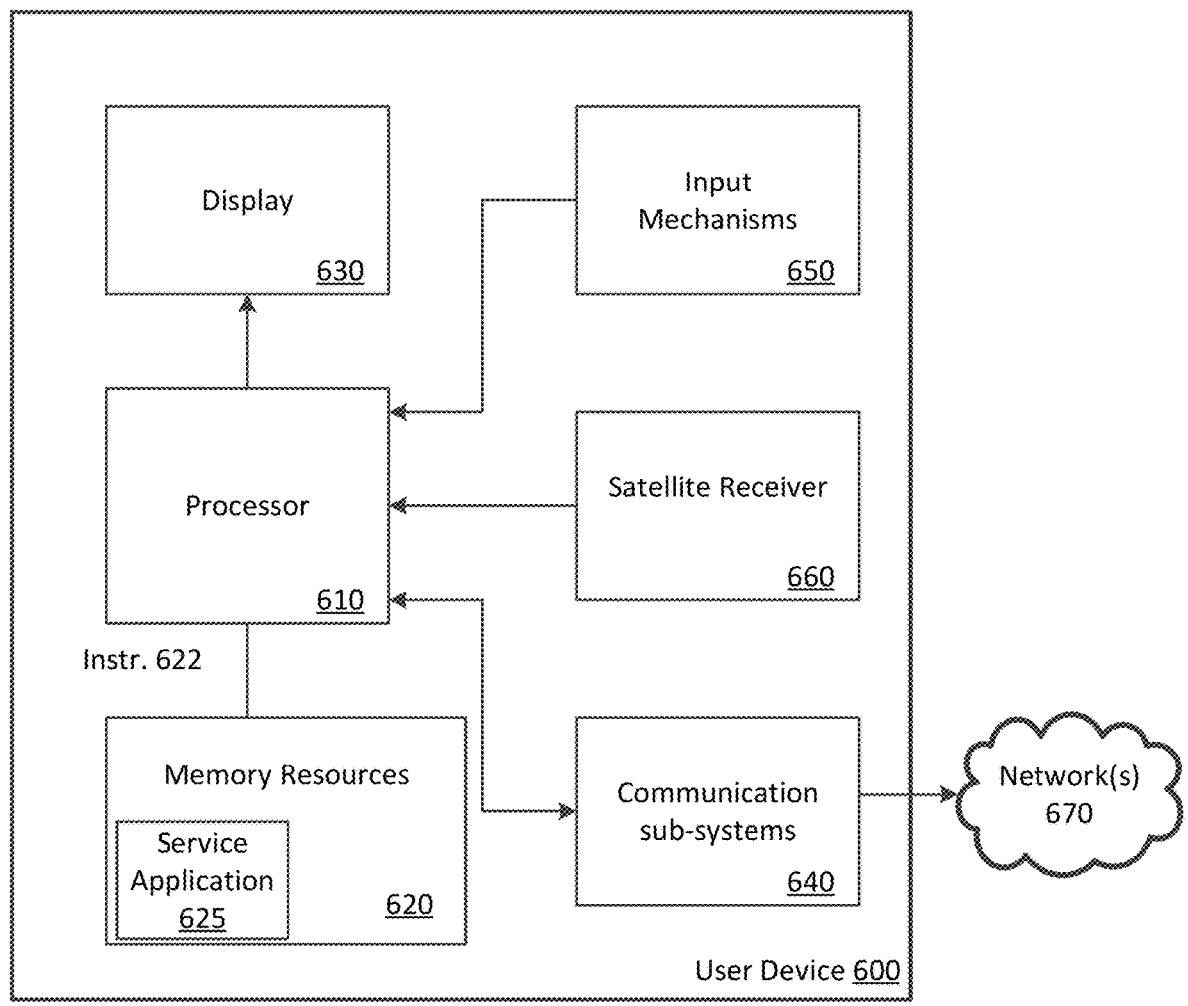
FIG. 6 is a block diagram that illustrates a computing device upon which examples described herein may be implemented.

FIG. 6 is a block diagram that illustrates a computing device upon which examples described herein may be implemented. In one embodiment, a computing device 600 may correspond to a mobile computing device, such as a cellular device that is capable of telephony, messaging, and data services. The computing device 600 can correspond to a device operated by a freight operator (e.g., operator device 124 and/or operator device 204). Examples of such devices include smartphones, handsets, tablet devices, or in-vehicle computing devices that communicate with cellular carriers.

The computing device 600 includes a processor 610, memory resources 620, a display device 630 (e.g., such as a touch-sensitive display device), one or more communication sub-systems 640 (including wireless communication sub-systems), one or more sensors 650 (e.g., accelerometer, gyroscope, barometer, altimeter, microphone, camera), and one or more location detection mechanisms (e.g., GPS component) 660. In one example, at least one of the communication sub-systems 640 sends and receives cellular data over data channels and voice channels. The communications sub-systems 640 can include a cellular transceiver and one or more short-range wireless transceivers. The processor 610 can exchange data with a service arrangement system (not illustrated in FIG. 6) via the communications sub-systems 640.

The processor 610 can implement operators to provide load information 225 (see FIG. 2), including shipment values 215 (e.g., see FIG. 2) which are specific to the determination of additive cost for that freight operator. The processor 610 can implement such operations by executing instructions stored in the memory resources 620. The memory resources 620 can also store instructions for the service application 625. For example, the processor 610 is configured with software and/or other logic to perform one or more processes, steps, and other functions described with mobile computing devices of occupants of vehicles. In particular, the processor 610 can execute instructions and data stored in the memory resources 620 in order to execute a service application, such as described with various examples. In one example, the processor 610 may execute instructions 622 to communicate messages, notifications, service-specific information, and other data between the computing device 600 and the freight matching service 200.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A computer system comprising:
   one or more processors;
   a set of memory resources to store a set of instructions;
   wherein the one or more processors execute the set of instructions causing the computer system to:
   store a plurality of records, each record of the plurality of records representing a freight operator of a plurality of freight operators;
   track a current route of each respective freight operator of the plurality of freight operators, the current route of each respective freight operator being determined using location information transmitted by a freight operator device associated with the respective freight operator;
   determine a current freight load and freight trailer type of each respective freight operator of the plurality of freight operators;
   periodically update the record of each respective freight operator of the plurality of freight operators to reflect the current route of the respective freight operator;
   receive a freight load request from a computing device of a shipper, the freight load request identifying a freight load and a loading location for the freight load;
   determine a first threshold distance range based on the loading location for the freight load;
   based on the plurality of records, determine, from the plurality of freight operators, a first set of candidate freight operators having an additive travel distance for traveling to the load location that is within the first threshold distance range based on (i) a current location and the current route of each freight operator in the first set of candidate freight operators, (ii) the current freight load of each freight operator in the first set of candidate freight operators, and (iii) the freight trailer type of each freight operator in the first set of candidate freight operators;
   implement a process to match the freight load request to a matching freight operator among the first set of candidate freight operators, wherein implementing the process includes:
   (a) determining an amount of additive travel for each freight operator of the first set of candidate freight operators to pick up the freight load at the loading location;
   (b) selecting a freight operator of the first set of candidate freight operators for the freight load request based on the amount of additive travel for the selected freight operator being lowest among the first set of candidate freight operators; and
   based on whether the selected freight operator accepts the freight load request:
   (c) transmitting a notification to the freight operator device of the selected freight operator, the notification including information about the freight load request, and updating the record for the matching freight operator to reflect that the matching freight operator has accepted the freight load request; or
   (d) determining, from the plurality of freight operators, a second set of candidate freight operators having an additive travel distance for traveling to the loading location that is within a second threshold distance range and implement the process by repeating steps (a) through (c) among the second set of candidate freight operators, wherein the second threshold distance range extends beyond the first threshold distance range.

2. The computer system of claim 1, wherein the freight load request indicates a loading time that is immediate, and wherein the one or more processors determine the amount of additive travel for each individual freight operator of the first set of candidate freight operators based on a current location of the individual freight operator.

3. The computer system of claim 1, wherein the freight load request indicates a loading time that is for a future time interval, and wherein the one or more processors determine the amount of additive travel for each individual freight operator of the first set of candidate freight operators based on a likely future location of the individual freight operator.

4. The computer system of claim 1, wherein implementing the process further includes:
   determining (i) a first shipment value for the selected freight operator based on the determined amount of additive travel for the selected freight operator, and (ii) a second shipment value for the matching freight operator based on the determined amount of additive travel for the matching freight operator, wherein the first shipment value is different than the second shipment value.

5. The computer system of claim 4, wherein the notification for the matching freight operator enables the matching freight operator to accept the freight load request at the second shipment value determined for the matching freight operator.

6. The computer system of claim 4, wherein the one or more processors transmit the notification to the selected freight operator during a first time interval.

7. The computer system of claim 6, wherein the one or more processors transmit the notification to the freight operator device of the selected freight operator to output the information about the freight load request.

8. The computer system of claim 7, wherein the information about the freight load request includes the first shipment value determined for the selected freight operator.

9. The computer system of claim 1, wherein the one or more processors determine the first set of candidate freight operators based further at least in part on profile information of each freight operator in the first set of candidate freight operators.

10. The computer system of claim 1, wherein the one or more processors determine the first set of candidate freight operators based further at least in part on a fuel efficiency of a freight vehicle of each freight operator in the first set of candidate freight operators.

11. The computer system of claim 1, wherein the one or more processors exclude at least a second freight operator from the first set of candidate freight operators based at least in part on a number of continuous hours which the second freight operator has operated a freight vehicle.

12. The computer system of claim 1, wherein the one or more processors obtain logging data from an electronic logging device provided with a freight vehicle of the selected freight operator.

13. A non-transitory computer-readable medium that stores instructions, which when executed by one or more processors of a computer system, cause the computer system to perform operations that include:
   storing a plurality of records, each record of the plurality of records representing a freight operator of a plurality of freight operators;
   tracking a current route of each respective freight operator of the plurality of freight operators, the current route of each respective freight operator being determined using location information transmitted by a freight operator device associated with the respective freight operator;
   determining a current freight load and freight trailer type of each respective freight operator of the plurality of freight operators;
   periodically updating the record of each respective freight operator of the plurality of freight operators to reflect the current route of the respective freight operator;
   receiving a freight load request from a computing device of a shipper, the freight load request identifying a freight load and a loading location for the freight load;
   determining a first threshold distance range based on the loading location for the freight load;
   based on the plurality of records, determining, from the plurality of freight operators, a first set of candidate freight operators having an additive travel distance for traveling to the loading location that is within the first threshold distance range based on (i) a current location and the current route of each freight operator in the first set of candidate freight operators, and (ii) the freight trailer type of each freight operator in the first set of candidate freight operators;
   implementing a process to match the freight load request to a matching freight operator among the first set of candidate freight operators, wherein implementing the process includes:
   (a) determining an amount of additive travel for each freight operator of the first set of candidate freight operators to pick up the freight load at the loading location;
   (b) selecting a freight operator of the first set of candidate freight operators for the freight load request based on the amount of additive travel for the selected freight operator being lowest among the first set of candidate freight operators; and
   based on whether the selected freight operator accepts the freight load request:
   (c) transmitting a notification to the freight operator device of the selected freight operator, the notification including information about the freight load request, and updating the record for the matching freight operator to reflect that the matching freight operator has accepted the freight load request; or
   (d) determining, from the plurality of freight operators, a second set of candidate freight operators having an additive travel distance for traveling to the loading location that is within a second threshold distance range from the loading location and implement the process by repeating steps (a) through (c) among the second set of candidate freight operators, wherein the second threshold distance range extends beyond the first threshold distance range.

14. A method for matching freight loading requests to freight vehicles, the method being implemented by one or more processors and comprising:
   storing a plurality of records, each record of the plurality of records representing a freight operator of a plurality of freight operators;
   tracking a current route of each respective freight operator of the plurality of freight operators, the current route of each respective freight operator being determined using location information transmitted by a freight operator device associated with the respective freight operator;
   determining a current freight load and freight trailer type of each respective freight operator of the plurality of freight operators;
   periodically updating the record of each respective freight operator of the plurality of freight operators to reflect the current route of the respective freight operator;
   receiving a freight load request from a computing device of a shipper, the freight load request identifying a freight load and a loading location for the freight load;
   determining a first threshold distance range based on the loading location for the freight load;
   based on the plurality of records, determining, from the plurality of freight operators, a first set of candidate freight operators having an additive travel distance for traveling to the loading location that is within the first threshold distance range based on (i) a current location and the current route of each freight operator in the first set of candidate freight operators, (ii) the current freight load of each freight operator in the first set of candidate freight operators, and (iii) the freight trailer type of each freight operator in the first set of candidate freight operators;
   implementing a process to match the freight load request to a matching freight operator among the first set of candidate freight operators, wherein implementing the process includes:
   (a) determining an amount of additive travel for each freight operator of the first set of candidate freight operators to pick up the freight load at the loading location;
   (b) selecting a freight operator of the first set of candidate freight operators for the freight load request based on the amount of additive travel for the selected freight operator being lowest among the first set of candidate freight operators; and
   based on whether the selected freight operator accepts the freight load request:
   (c) transmitting a notification to the freight operator device of the selected freight operator, the notification including information about the freight load request, and updating the record for the matching freight operator to reflect that the matching freight operator has accepted the freight load request; or (d) determining, from the plurality of freight operators, a second set of candidate freight operators having an additive travel distance for traveling to the loading location that is within a second threshold distance range from the loading location and implement the process by repeating steps (a) through (c) among the second set of candidate freight operators, wherein the second threshold distance range extends beyond the first threshold distance range.

15. The method of claim 14, wherein the freight load request indicates a loading time that is immediate, and wherein determining the amount of additive travel for each individual freight operator of the first set of candidate freight operators is based on a current location of the individual freight operator.

16. The method of claim 14, wherein the freight load request indicates a loading time that is for a future time interval, and wherein determining the amount of additive travel for each individual freight operator of the first set of candidate freight operators is based on a likely future location of the individual freight operator.

17. The method of claim 14, wherein implementing the process further includes:

determining (i) a first shipment value for the selected freight operator based on the determined amount of additive travel for the selected freight operator, and (ii) a second shipment value for the matching freight operator based on the determined amount of additive travel for the matching freight operator, wherein the first shipment value is different than the second shipment value.

18. The method of claim 17, wherein the notification for the matching freight operator enables the matching freight operator to accept the freight load request at the second shipment value determined for the matching freight operator.

19. The method of claim 17, wherein the one or more processors transmit the notification to the selected freight operator during a first time interval.

* * * * *